(No Model.) 2 Sheets—Sheet 2.
J. BOLTON.
DRESS GUARD AND DRIVING WHEEL SUPPORT.
No. 484,399. Patented Oct. 18, 1892.
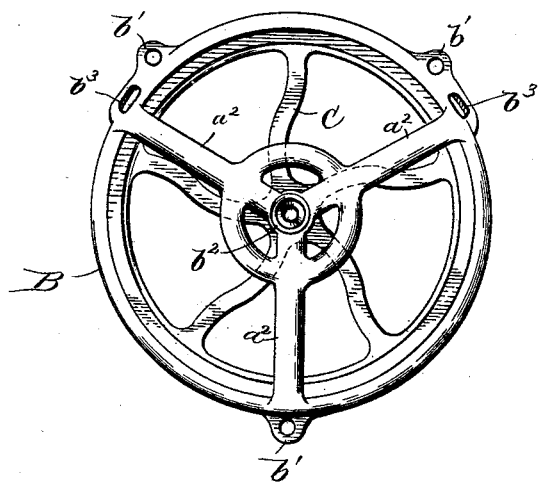
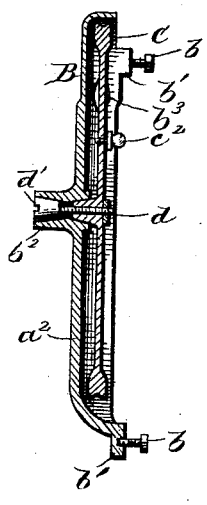
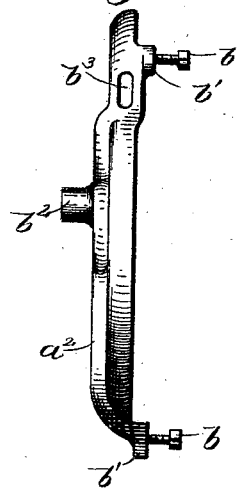

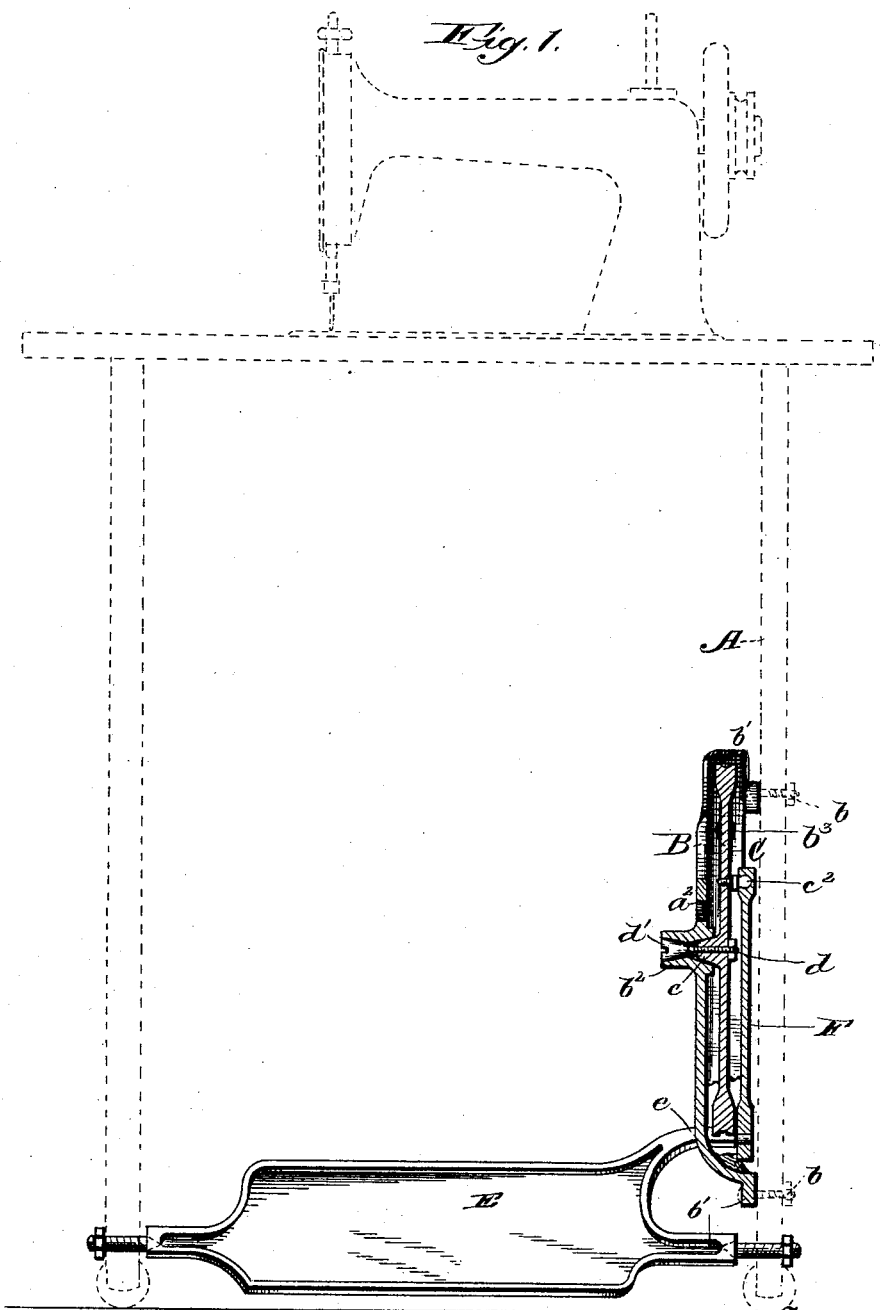

UNITED STATES PATENT OFFICE.

JAMES BOLTON, OF CHICAGO, ILLINOIS.

DRESS-GUARD AND DRIVING-WHEEL SUPPORT.

SPECIFICATION forming part of Letters Patent No. 484,399, dated October 18, 1892.

Application filed February 29, 1892. Serial No. 423,142. (No model.)

*To all whom it may concern:*

Be it known that I, JAMES BOLTON, a citizen of the United States, residing at Chicago, in the county of Cook and State of Illinois, have invented certain new and useful Improvements in Dress-Guards and Driving-Wheel Supports for Sewing-Machines, of which the following is a specification, reference being had therein to the accompanying drawings.

My invention has for its object to provide a convenient dress-guard and support for the driving-wheel of a sewing-machine-treadle mechanism of such construction that it may readily be applied either to an ordinary iron side frame of a sewing-machine stand or to the side of a sewing-machine cabinet, the bearing of the driving or fly wheel being of such construction that any wear may be readily compensated for, while the said bearing will be of such lateral dimensions as to support the driving-wheel in a strong and positive manner. To this end I provide a frame, which is preferably of skeleton construction and which is of circular form, said frame being provided with ears by which it may be attached to the side frame of a sewing-machine stand. The said frame has on its inner side suitable arms to form a dress-guard and a central hub in which the driving-wheel is journaled. The rim of said frame surrounds or incloses the rim of the driving-wheel, and thus prevents contact of the dress of the operator with the said wheel-rim, while the arms of the said frame keep the operator's dress away from the spokes of the driving or fly wheel. The driving or fly wheel is provided with a conical hub fitting in a conical seat in the hub of the dress-guard and support, and into said conical hub of the driving or fly wheel is tapped a screw having a conical head, which has a corresponding bearing in the outer portion of the dress-guard and support. As the screw may be adjusted in the conical hub of the driving-wheel, any wear may be readily compensated for, while the screw and head together form a lateral bearing of suitable extension, so as to steadily support the driving-wheel. The screw is fixed to the hub of the driving-wheel, so as to rotate therewith, and thus practically forms a part of the journal of said wheel. The pitman connecting the driving-wheel to the treadle is arranged inside of said wheel and between the latter and the side frame of the stand, the lateral dimensions of the dress-guard and wheel-support being such as to permit of this arrangement of the pitman.

In the accompanying drawings, Figure 1 represents my invention as applied to a sewing-machine stand, the latter, with the sewing-machine thereon, being indicated by dotted lines. Fig. 2 is a detail face view of my dress-guard and wheel-support, with the wheel journaled therein. Fig. 3 is a sectional view, and Fig. 4 a side view, of the dress-guard and wheel-support, the driving-wheel being shown in section in Fig. 3.

A denotes the side frame of a sewing-machine stand, and B my improved dress-guard and driving-wheel support secured thereto in any suitable manner, as by screw-bolts $b$, passing through or tapped into ears $b'$ of the dress-guard and support. This dress-guard and support is preferably made in skeleton form, as more clearly shown in Fig. 2, with arms $a^2$ extending from the central hub $b^2$ thereof to the periphery of the support. Any suitable number of arms $a^2$ may be employed. Three are shown in Fig. 2. The sectional view shown in Fig. 3 denotes that four such arms may be employed.

C denotes the driving-wheel, provided with a conical hub $c$, fitting in a corresponding opening in the hub $b^2$ of the dress-guard and support B. A screw $d$, provided with a conical head $d'$, is secured to the hub of the driving-wheel, so as to rotate therewith, and the said conical hub has a suitable bearing in the hub $b^2$ of the dress-guard and wheel-support. It will be observed that the conical journals afforded by the hub of the driving-wheel and the head of the screw are oppositely arranged or with their apexes toward each other. This construction affords a strong and solid bearing for the driving-wheel, and by adjusting the screw in the hub of the wheel any wear may be readily compensated for.

E denotes a treadle, which may be of any suitable construction and which is suitably mounted on supports in the sewing-machine stand, the said treadle having an arm $e$, connected by a pitman F with a crank-pin $c^2$ on the driving-wheel C. The wheel-support and dress-guard are preferably of such lateral depth as to afford room for the pitman F between the driving-wheel C and the side frame A of the sewing-machine stand, so that the said pitman, as well as the driving-wheel, is thus housed within the dress-guard and support, the latter being provided with openings $b^3$ for the passage of the belt extending from the driving-wheel C upward to the driving-pulley on the sewing-machine mounted upon the stand or table.

It will be understood from the foregoing that my improved dress-guard and driving-wheel support is entirely separate from the side frame of the stand, and may therefore, with the driving-wheel mounted therein, be applied to any form of stand, being thus equally applicable to iron stands or to cabinets having side frames, which are of wood.

Having thus described my invention, I claim and desire to secure by Letters Patent—

1. A dress-guard and driving-wheel support for a sewing-machine stand, consisting of a suitable frame constructed to surround the driving-wheel and formed separate from but adapted to be attached to a side frame of a sewing-machine stand, combined with a driving-wheel journaled in the hub of said dress-guard and wheel-support, the said driving-wheel having a journal consisting of two oppositely-arranged conical portions with their apexes toward each other, one of said conical portions being adjustable to compensate for wear, substantially as set forth.

2. A dress-guard and driving-wheel support for a sewing-machine stand, consisting of a skeleton frame constructed to surround the driving-wheel and formed separate from but adapted to be attached to a side frame of a sewing-machine stand and having a central hub or bearing portion, combined with a driving-wheel journaled in said hub or bearing portion and having a journal consisting of two oppositely-arranged conical parts, with their apexes toward each other, a treadle, and a pitman connecting said driving-wheel with the said treadle, said pitman being arranged on the inner face of said driving-wheel and between the latter and the side frame of the stand.

3. The combination, with the side frame of a sewing-machine stand, of a dress-guard and driving-wheel support formed separate therefrom, but adapted to be secured thereto, and constructed to surround the driving-wheel, which latter is suitably journaled in said dress-guard and wheel-support, a treadle, and a pitman connecting said treadle with said driving-wheel.

In testimony whereof I affix my signature in presence of two witnesses.

JAMES BOLTON.

Witnesses:
T. M. CONPROPST,
F. S. FOUSE.